United States Patent Office 3,019,041
Patented Jan. 30, 1962

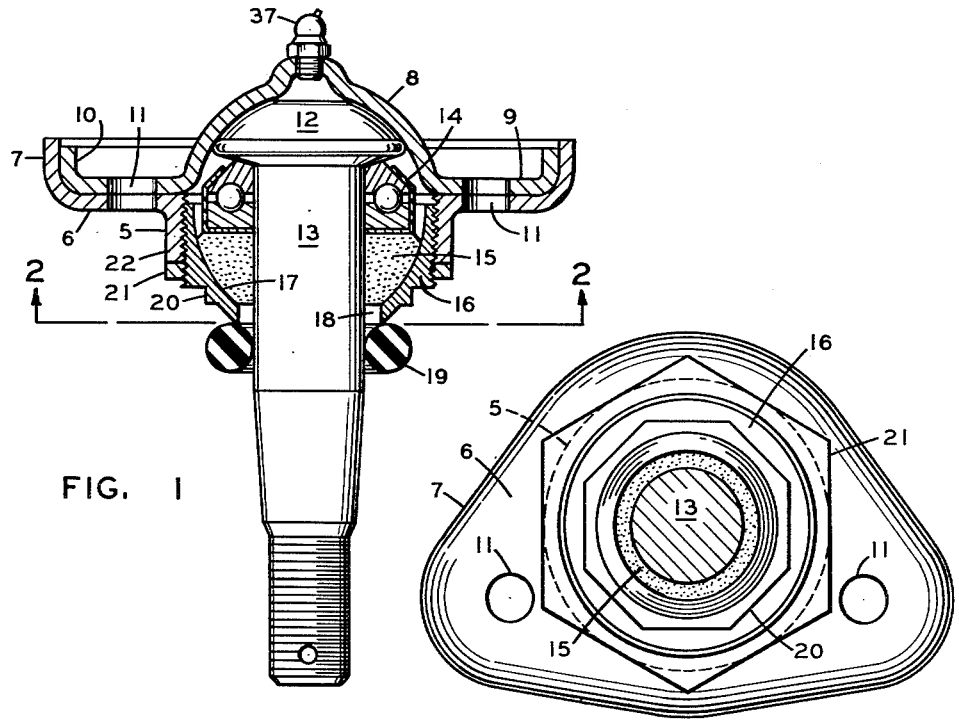
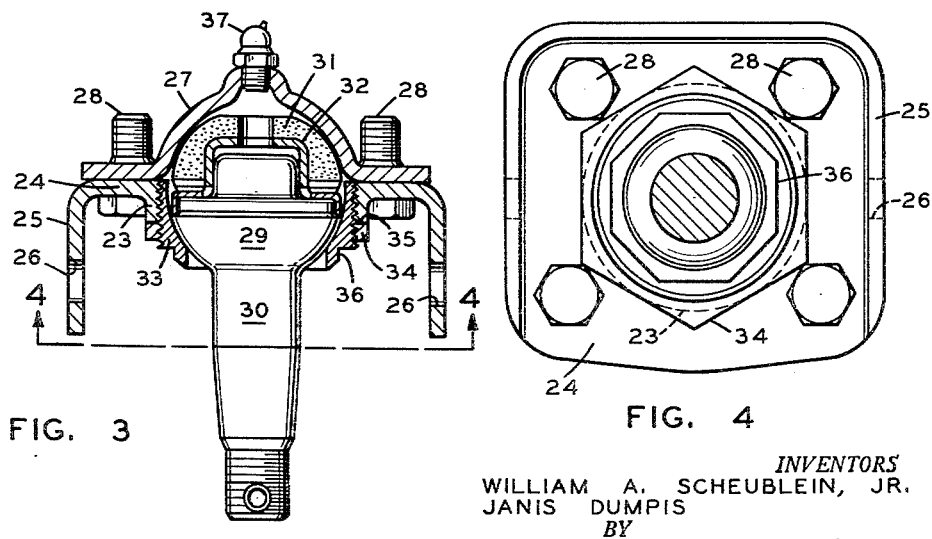
FIG. 1  FIG. 2  FIG. 3  FIG. 4
INVENTORS
WILLIAM A. SCHEUBLEIN, JR.
JANIS DUMPIS

3,019,041
ADJUSTABLE BALL JOINT ASSEMBLY
William A. Scheublein, Jr., St. Louis, and Janis Dumpis, Overland, Mo., assignors to Moog Industries, Inc., St. Louis, Mo., a corporation of Missouri
Filed Aug. 25, 1958, Ser. No. 756,885
4 Claims. (Cl. 287—87)

This invention pertains to improvements in adjustable ball joint assemblies, and it is a general object hereof to simplify the construction of ball joint devices in which adjustability is an important characteristic.

The ball joint devices of this invention are adapted for use in a vehicle wheel suspension system of the character disclosed in our prior application Serial Number 694,287, filed November 4, 1957, now Patent No. 2,954,993.

It is another object of the present invention to improve on the arrangement of parts of a ball joint device so that portions of the body structure are relatively adjustable to take care of manufacturing tolerances and to provide for wear compensation in service.

The invention consists in the several embodiments and parts and components of adjustable ball joint devices chosen for illustration in the accompanying drawings, wherein:

FIG. 1 is a sectional elevational view of a ball joint device showing one preferred arrangement of the construction;

FIG. 2 is a plan view, partly in section, of the device seen at line 2—2 in FIG. 1;

FIG. 3 is a sectional elevational view of a ball joint device showing another preferred arrangement and a variant construction for mounting the device; and FIG. 4 is a plan view of the device of FIG. 3.

The ball joint device of FIGS. 1 and 2 is adapted for flat mounting on a control arm of a vehicle wheel suspension system or the like, and includes a body part 5 of cylindrical form having a plate-like mounting flange 6 with a peripheral stiffening lip 7. The body part 5 is partly closed by a spherically shaped cap 8 also having a plate-like flange 9 with a lip 10 to mate with the parts 6 and 7. A plurality of bolt or rivet apertures 11 are formed in the parts 6 and 9. The body 5 and cap 8 enclose the headed end portion 12 of a stud 13, and the anti-friction bearing 14 positioned between the head 12 and a bearing member 15. An adjustable closure plug 16 is threaded into the cylindrical body part 5 and forms a spherical seat 17 matching the form of member 15 whereby the stud 13 may swivel or swing to desired angular positions. The plug 16 has a stud aperture 18 for the stud 13 and a dust and dirt excluding seal ring 19 is carried by the stud 13 over such aperture 18.

Looseness in the assembled parts 12, 14 and 15 within the device, and manufacturing tolerances may be quickly and easily adjusted by turning the closure plug 16 at the tool surface 20, after which the locking nut 21 is suitably tightened against the end face 22 of the part 5 to frictionally secure the threaded adjustment of plug 16. This construction embodies a greatly simplified and easily adjusted ball joint device, and the parts thereof are economically manufactured.

In FIGS. 3 and 4, the ball joint device consists of a construction adapted for side attachment to the skirt portions of a control arm, and, therefore, the body part 23 has a flange 24 with extended sides 25 which may be connected to the control arm skirt at bolt or rivet apertures 26. A spherically formed cap 27 is secured by bolt means 28 to the flange 24 to form an enclosure for the headed end 29 of a stud 30 and for a suitable bearing member 31 disposed on the head 29 in conjunction with a wear element 32. The bearing member 31 and head 9 are swivelly movable in the body 23 and cap 27 and are retained in adjusted relation by means of a closure plug 33 which is threaded into the part 23 and secured by a lock nut 34 bearing upon the end 35 of the body part 23. The plug may be turned by a tool engaging on the surface 36, and, though not shown, an external seal ring, such as 19 in FIG. 1, is placed at the opening in the plug 33 for the stud 30.

Looseness in the assembled parts 29 and 31 within this device, as in the previously described device, are quickly and easily adjusted by turning the plug 33 and by securing the same through the locking nut 34. It is obvious from the foregoing that the advantages of the device of FIG. 3 are similar to those pointed out for the device of FIG. 1. Lubrication for these devices is provided by a suitable fitting 37 mounted in the cap parts 8 and 27, as is understood.

The several forms of the invention may be varied in certain respects, but it is understood that all such variations are to be included which come within the scope of the appended claims.

What is claimed is:

1. In a movable joint device adapted to take tension or compression loads in a vehicle wheel mounting assembly subjected to variable load carrying requirements and vibration effects in service, the improvement of a housing of pressed metal body and cap members having flanges in juxtaposition, one of said members having a spherical seat surface with a lubricant receiving space therein, the other of said members having a central aperture formed with a cylindrical wall aligned with said spherical seat surface, said cylindrical wall having a diameter substantially matching the largest diameter of said spherical seat surface, a stud member having a headed end and a shank, said headed end having a spherically shaped bearing portion, a bearing member cooperating with said headed end in forming a load bearing unit in said housing, and means retaining said unit in the housing in operative position, said means including a plug element having an inner spherical seat surface which cooperates with the first mentioned seat surface in supporting said load bearing unit and taking the service loads in the vehicle wheel mounting assembly, said plug element having threaded connection with the cylindrical wall on the other of said members and being provided with an aperture through said inner seat surface to pass said stud shank and permit angular movement of said shank, and a locking element having a threaded connection with said plug element and a friction abutment on the other of said members.

2. The movable joint device set forth in claim 1, wherein said juxtaposed flanges include alignment lips with one lip seated internally of the other lip, and means engaging said flanges to retain them in assembly also retains said lips in seated relation.

3. The movable joint device set forth in claim 1, wherein said flanges on said body and cap members each have a lip extending about the periphery stiffening the pressed metal members and serving to locate said members with the cylindrical wall and first mentioned spherical seat surface in alignment.

4. In a ball joint device for operatively connecting a vehicle wheel to the vehicle to take tension or compression loads imposed by the vehicle reaction to loads and the wheel reaction to the ground: the improvement of a housing formed with an internal spherical seat surface and an open end opposed to said seat surface; a stud member having a headed end and a shank, the headed end bearing upon said spherical surface and the shank extending from said housing through the open end; adjustable positionable means to retain said stud member in said housing comprising a member threadedly mounted in said housing in the open end and over said stud shank, and means engaging with said housing and said threaded member to retain the latter in adjusted position; and mounting means on said housing to connect the latter to a portion of the vehicle, said mounting means including a flange on said housing adjacent to and surrounding said member threadedly mounted in said housing, and means attaching the flange of the ball joint device to the vehicle with the open end free to expose said adjustable means.

References Cited in the file of this patent

UNITED STATES PATENTS

| | | |
|---|---|---|
| 1,639,692 | Gauthier | Aug. 23, 1927 |
| 2,645,510 | Booth | July 14, 1953 |
| 2,857,190 | Moskovitz | Oct. 27, 1958 |
| 2,886,299 | Heimaster et al. | May 12, 1959 |

FOREIGN PATENTS

| | | |
|---|---|---|
| 109,415 | Australia | Jan. 11, 1940 |